Feb. 4, 1941.                J. S. PECKER                2,230,811
              AIRCRAFT EQUIPPED WITH A SUSTAINING ROTOR
                   Filed Dec. 8, 1939        2 Sheets-Sheet 1

INVENTOR:
Joseph S. Pecker
BY
Synnestvedt + Lechner
ATTORNEYS.

Patented Feb. 4, 1941

2,230,811

UNITED STATES PATENT OFFICE 2,230,811

AIRCRAFT EQUIPPED WITH A SUSTAINING ROTOR

Joseph S. Pecker, Philadelphia, Pa., assignor to Autogiro Company of America, Willow Grove, Pa., a corporation of Delaware Application December 8, 1939, Serial No. 308,111

11 Claims. (Cl. 244—17)

This invention relates to aircraft of the type equipped with a sustaining rotor and is particularly concerned with rotor hub structure and driving and mounting means therefor.

One of the principal objects of the invention is the provision of pivot means for tilting the rotor hub and other pivot means articulating the blades to the hub, the axes of all of which pivot means intersect or pass close to the rotor axis.

The invention further contemplates pivot arrangements of the type above mentioned which are so arranged with respect to each other and with respect to other parts of the hub, such as the bearings, as to produce a compact hub unit.

Another object of the invention is the provision in a hub structure of the type mentioned of a drive mechanism arranged so that most of the driving elements are not tiltable with the hub, there being only a single flexible drive transmitting connection between the last driving element and the rotatable and tiltable hub proper. Since drive mechanisms for rotors of this type commonly incorporate gearing located at or close to the hub, the feature just mentioned is of especial advantage since it eliminates the necessity for mounting such gearing for tilting with the rotative hub part.

The manner in which the foregoing objects and advantages are achieved, and also others which will occur to those skilled in the art, will be plain from the following description referring to the accompanying drawings, in which—

Figure 1:
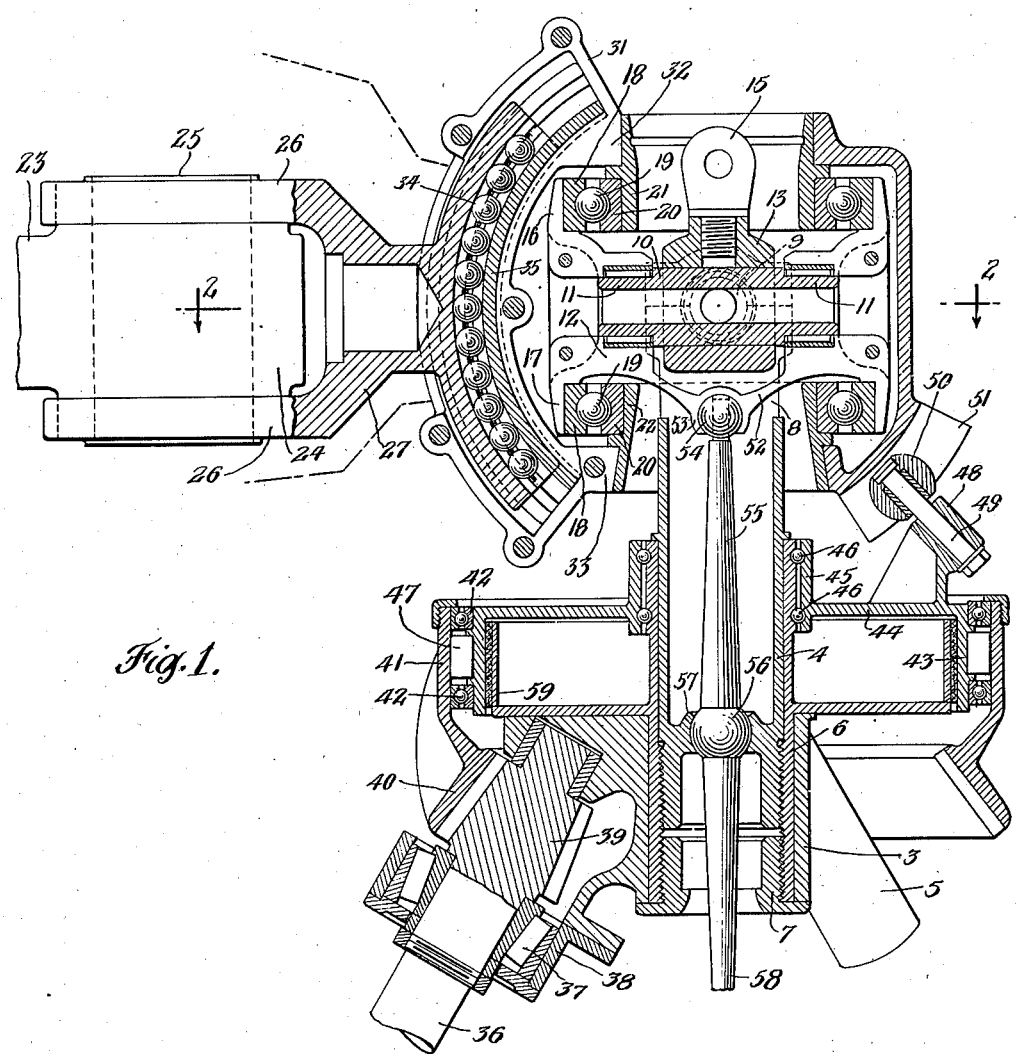
Figure 2:
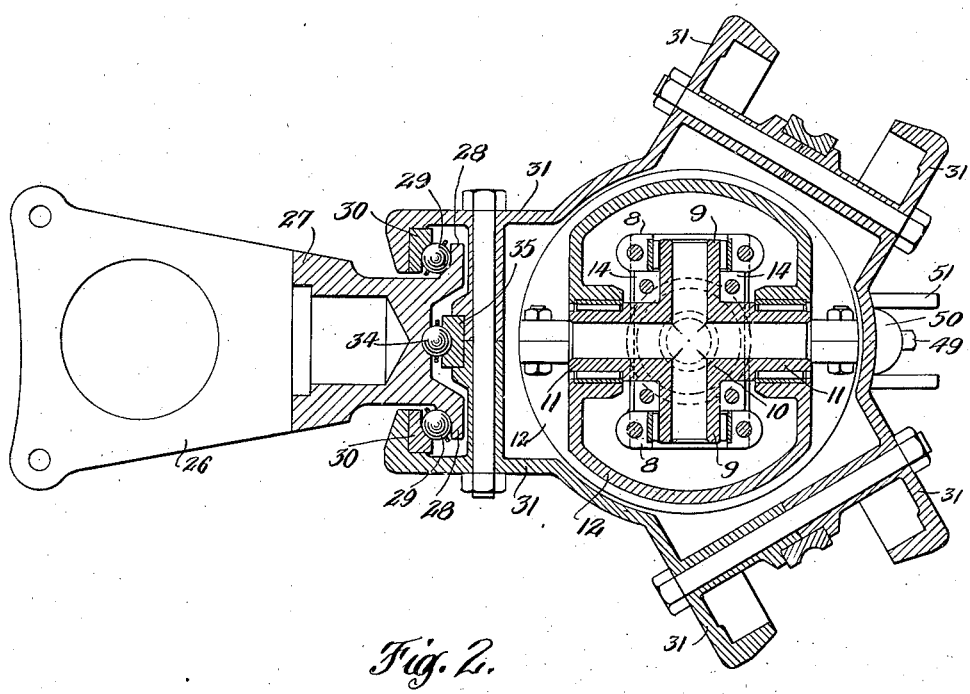

Figure 1 is a vertical sectional view through a rotor hub and associated parts, constructed in accordance with the present invention, and Figure 2 is a horizontal sectional view taken substantially as indicated by the section line 2—2 on Figure 1.

In the drawings the numeral 3 indicates a sleeve for supporting the non-rotative hub spindle 4, the sleeve being carried at the top of one or more structural elements 5 which may be connected with the framing in the body of the aircraft (not shown).

A second sleeve 6 is interposed between spindle 4 and the supporting sleeve 3, all of these parts being secured together by the flanged collar 7, as clearly appears.

Toward its upper end the spindle 4 is provided with a pair of spaced upstanding lugs or brackets 8 equipped with vertically separable bearing block and cap parts for cooperation with the pivot projections 9—9 of a universal block 10, which block also has a second pair of pivot parts 11—11 projecting therefrom at right angles to the parts 9—9. A non-rotative hub supporting part 12 is mounted on the pivots 11—11, the rotative hub part (to be described hereinafter) being journalled on this non-rotative part 12. The universal connection 10, therefore, provides freedom for tilting movement of the hub in all directions with respect to the supporting spindle 4. A four-pronged horizontally split lifting fork 13 may be associated with this joint, the prongs 14 embracing the cross-shaped universal block 10, as clearly seen in Figure 2. The lifting fork may be equipped with an apertured eye 15, by means of which the entire craft may be lifted, or the rotor may be raised as a unit from the supporting structure upon removal of the flanged nut 7.

As seen in Figure 1, the hub supporting part 12 is provided with upper and lower annular flanges 16 and 17 having seats for the reception of the outer races 18 of bearings 19, the inner races 20 of which bearings cooperate with upper and lower rings 21 and 22 which constitute parts of the hub member proper which rotates with the rotor. The non-rotative and rotative hub parts, therefore, respectively occupy the positions of external and internal hub parts.

The blades of the rotor (which may be of any number desired, three being shown in the embodiment illustrated) are each connected with the rotative hub part, as follows:

Each blade spar or root end fitting 23 is provided with an apertured eye 24 at its inner end adapted to cooperate with the pivot pin 25 which is carried in apertured ears or prongs 26—26 formed as part of the articulation block 27. The axis of pin 25 is generally upright, thus providing freedom for movement of the blade fore and aft in its rotative path of travel. At its inner end the articulation block 27 is provided with a pair of arcuate bearing races 28—28, each in the form of an arcuate flange projecting away from a radial plane containing both the longitudinal axis of the blade and the rotational axis of the hub. Each race rides on a series of balls 29 which in turn ride on outer complementary arcuate race 30 seated in recesses formed at the outer extremities of plate 31 which consitutes a part of the rotative hub member proper. At the upper and lower ends of the arcuate bearings, the plate members 31 are joined with the internal bearing collars 21 and 22 by webbing indicated at 32 and 33.

As clearly appears in Figure 1, the center of curvature of the several arcuate bearing shoes and races coincides with the center of the universal joint 10 which, as above noted, lies on the rotor axis line. Thus the blade is provided freedom for movement in the "flapping" sense, i. e., in a direction generally transverse the rotative path of travel.

To ensure proper seating of the arcuate bearing elements 28, 29 and 30, another arcuate bearing is interposed between the two first described, including a series of balls 34 running between an internal arcuate surface formed on the articulation block 27 and an external arcuate surface formed on the race 35, which latter is fixedly carried on the rotative hub.

By reference to Figure 1 it will be seen that the arrangement of the various parts above described is such that the main rotor bearings 19—19 and the non-rotative hub support 12 are nested within the arcuate bearing elements providing the flapping articulations for the several blades. This arrangement thus provides a high degree of compactness, notwithstanding the fact that the flapping articulation axes intersect the rotational axis of the hub, and further notwithstanding the fact that the hub is tiltable about pivot means also having axes intersecting the hub axis.

For purposes of starting the rotor prior to take-off from the ground, a drive mechanism is preferably employed, including a drive shaft 36 extended upwardly from the body of the machine toward the rotor hub, being connected in the body of the aircraft with any suitable prime mover, such as the engine commonly employed to drive the propulsive air screw during translational flight. The upper end of drive shaft 36 is journalled as by bearing 37 in a housing 38 rigid with the hub supporting socket 3. The shaft 36 serves to drive pinion 39 engaging an internal ring gear 40 which is fixed to a ring 41 journalled by bearings 42 on the flange 43 of a drum having a web or disk part 44 surrounding the non-rotative supporting spindle 4. The disk 44 is centrally apertured and provided with a collar 45 which is journalled by bearings 46 on the non-rotative sleeve 6.

An overrunning clutch incorporating roller elements 47 is interposed between the ring 41 and the cylindrical part 43 of the drum, the drum thereby being rotated by the drive in one direction but being free to overrun the drive, as when the usual manually operable rotor drive clutch is disconnected.

It will be noted that all of the drive parts thus far described, including the gearing, overrunning clutch, etc., are so mounted as not to move with the rotative hub part during tilting thereof on the axes provided by the universal joint 10.

The drive transmitting connection between the driven drum 43—44 and the rotative hub part includes a bracket 48 projecting upwardly from the disk 44 and serving to mount the spindle 49 carrying a rotatable spherical driving element 50 lying between a pair of spaced shoes 51 which are rigid with and project from the rotative hub part. This drive connection 50—51 thus provides for transmission of torque to the rotative hub part notwithstanding the fact that the hub is tiltable in all directions by means of the universal 10.

Tilting of the rotor hub may be employed for control of the craft in flight in the manner described, for example, in the copending application of Juan de la Cierva, Serial No. 645,985, filed December 6, 1932, and for this purpose the non-rotative hub supporting member 12 is provided with a central depending web part 52 having a socket 53 for cooperation with ball 54 slidably mounted at the upper end of lever 55, which in turn is universally mounted by a ball 56 received in a socket 57 formed internally of the hub spindle. The arm or lever 58 projecting downwardly from ball 56 is formed rigid with said ball and with said upper arm 55, and by coupling control connections with arm 58 it will be seen that the leverage system may be tilted in all directions, and thereby the rotor hub may be correspondingly tilted to effect maneuvering of the craft in pitch and roll.

If desired, an internal expanding rotor brake 59 may be arranged to cooperate with the internal surface of the drum part 43.

In accordance with the invention, therefore, provision is made for driving the rotor, for instance in preparation for take-off, the driving elements, for the most part, being mounted on simple radial bearings coaxial with the hub supporting spindle. These driving elements are thus not tiltable with the rotor and its hub, the torque being transmitted from the last driving elements in the series to the hub proper by means of the novel drive connection above referred to, incorporating elements 50—51, which serve to accommodate tilting movement of the hub.

In addition, the arcuate shoe and bearing arrangement for mounting the blades on the hub with freedom for flapping movement is so disposed as to provide flapping pivot axes which intersect the rotational axis and also the axes provided for tilting the hub as a whole. This is accomplished, moreover, while maintaining a relatively small overall diameter of the hub. Note particularly that the primary rotor hub bearings 19—19 and parts associated therewith, are nested within the arcuate bearing elements employed in the flapping articulation for the blades.

I claim:

1. In a bladed aircraft sustaining rotor, a hub structure including cooperating internal and external parts, the internal part being rotatively supported by the external part, and articulation means for connecting a blade with the rotative hub part including an arcuate bearing member secured to the rotative hub part and lying in a generally upright plane, the non-rotative hub supporting part being nested within the arcuate bearing member.

2. In a bladed aircraft sustaining rotor, a hub structure including cooperating internal and external parts, the internal part being rotatively supported by the external part, and articulation means for connecting a blade with the rotative hub part including an arcuate bearing member lying in a generally upright plane and secured to the rotative hub part above and below the non-rotative hub supporting part.

3. In a bladed aircraft sustaining rotor, a hub structure including cooperating internal and external parts, the internal part being rotatively supported by the external part, articulation means for connecting a blade with the rotative hub part including an arcuate bearing member secured to the rotative hub part and lying in a generally upright plane, the non-rotative hub supporting part being nested within the arcuate bearing member, and means for mounting the hub supporting part including pivot means providing for tilting of the hub supporting part about an axis intersecting the rotational axis of the hub.

4. In a bladed aircraft sustaining rotor, a hub structure and mounting mechanism therefor comprising a fixed mounting member, a non-rotative hub supporting part pivotally connected with said mounting member, the hub supporting part having internal radial bearing means associated therewith, an internal rotative hub part cooperating with said bearing means, and articulation means for connecting a blade with the rotative hub part including an arcuate bearing element lying in a generally upright plane and secured to the rotative hub part, the arcuate bearing element embracing the non-rotative hub supporting part.

5. In a bladed aircraft sustaining rotor, a hub structure and mounting mechanism therefor comprising a fixed mounting member, a non-rotative hub supporting part pivotally connected with said mounting member, the hub supporting part having internal bearing means associated therewith above and below the plane of pivotal connection of the hub supporting part with said mounting member, a rotative hub part having complementary bearing means disposed concentrically within the first bearing means, and means for connecting a blade with the rotative hub part including a blade articulation incorporating an arcuate bearing element connected with the rotative hub part above and below the non-rotative hub supporting part, which latter is nested within the arcuate bearing element.

6. In a bladed aircraft sustaining rotor, a hub structure including cooperating internal and external parts, the internal part being rotatively supported by the external part, articulation means for connecting a blade with the rotative hub part, including an arcuate bearing member secured to the rotative hub part and lying in a generally upright plane, the non-rotative hub supporting part being nested with the arcuate bearing member, means for mounting the hub supporting part including pivot means providing for tilting of the hub supporting part about an axis intersecting the rotational axis of the hub, and mechanism for driving the rotor including a driving element rotatable in a fixed plane and a flexible driving connection between said driving element and the rotative hub part accommodating tilting movement of the hub.

7. In a bladed aircraft sustaining rotor, a hub, rotor drive and mounting structure therefor including a non-rotative hub supporting spindle, a rotative driving element journalled coaxially with said spindle, internal and external hub parts, the former of which is rotatable with the rotor and is supported by the latter, pivot means interconnecting the hub supporting member with said hub spindle and providing freedom for tilting movement, blade articulation means connecting a blade with the rotative hub part, and a flexible driving connection between said driving element and the rotative hub part, including a pair of shoes formed on the rotative hub part and spaced from each other, and a cooperating complementary drive transmitting element connected with said driving element.

8. In a bladed aircraft sustaining rotor, a rotative hub part, articulation means for connecting the blade with the rotative hub part including arcuate bearing races with rolling elements therebetween, the inner race being connected with the blade and the outer race with the rotative hub part, and additional arcuate bearing means associated with the blade and the rotative hub part including internal and external bearing races with rolling elements therebetween, the internal race being associated with the rotative hub part and the external race with the blade.

9. In a bladed aircraft sustaining rotor, a rotative hub part, articulation means for connecting the blade with the rotative hub part including arcuate bearing races with rolling elements therebetween, the inner race being connected with the rotative hub part and the outer race with the blade, and two pairs of arcuate bearing races with rolling elements therebetween, one pair being offset to one side and the other to the other side of the longitudinal blade axis, the inner races of each pair being associated with the blade and the outer races with the rotative hub part.

10. In a bladed aircraft sustaining rotor, a non-rotative hub supporting member, a rotative hub part mounted thereon with freedom for tilting movement, a rotative driving part mounted on the hub supporting member, and a flexible drive transmitting connection between said parts accommodating tilting movement of the rotative hub part and arranged externally thereof.

11. In a bladed aircraft sustaining rotor, a non-rotative hub supporting member, a rotative hub part mounted thereon with freedom for tilting movement, a rotative driving part mounted on the hub supporting member, and a flexible drive transmitting connection between said parts accommodating tilting movement of the rotative hub part and arranged externally thereof, the said flexible connection including a pair of spaced shoes on one of said parts substantially paralleling a radial plane containing the rotor axis, and a cooperating driving member on the other of said parts projecting between said pair of shoes.

JOSEPH S. PECKER.